United States Patent
Lanzetta et al.

[11] Patent Number: 6,019,530
[45] Date of Patent: Feb. 1, 2000

[54] KEYBOARDS WITH RETRACTABLE KEYS

[75] Inventors: Alphonso Philip Lanzetta, Marlboro; David Andrew Lewis, Carmel; Lawrence Shungwei Mok, Brewster; Stanley Joseph Whitehair, Peekskill, all of N.Y.

[73] Assignee: International Business Machines Corporation, Armonk, N.Y.

[21] Appl. No.: 09/129,508

[22] Filed: Aug. 5, 1998

[51] Int. Cl.[7] .......................................................... B41J 5/08
[52] U.S. Cl. ................... 400/491.1; 400/490; 400/495.1
[58] Field of Search ............................. 400/491.1, 491.2, 400/490, 472, 495, 495.1

[56] References Cited

U.S. PATENT DOCUMENTS

| | | | |
|---|---|---|---|
| 4,795,888 | 1/1989 | MacFarlane | 400/480 X |
| 5,163,765 | 11/1992 | Levy | 400/492 |
| 5,220,521 | 6/1993 | Kikinis | 364/709.08 |
| 5,459,461 | 10/1995 | Crowley et al. | 400/491.1 X |
| 5,595,449 | 1/1997 | Vitkin | 400/491.1 X |
| 5,694,124 | 12/1997 | Wood | 400/495 X |
| 5,812,116 | 9/1998 | Malhi | 400/491.1 X |

*Primary Examiner*—Ren Yan
*Assistant Examiner*—Minh H. Chau
*Attorney, Agent, or Firm*—Daniel P. Morris

[57] ABSTRACT

The invention is directed to a keyboard where the keys are raised up from a retracted position upon the initialization of usage of the keyboard. An embedded airbag mechanism is self-inflatable to raise keys to the normal operating heights. The keys will be retracted when the airbag is deflated. The rising and retracting of the keys can also be controlled by hinge-like structure. The close and open of the cover of a laptop computer will activate the mechanism to raise and retract the keys on the keyboard.

14 Claims, 4 Drawing Sheets

KEYBOARDS WITH RETRACTABLE KEYS

FIELD OF INVENTION

The present invention is directed to a keyboard apparatus having retractable keys. The keyboard apparatus can be used in computers or other musical instruments.

BACKGROUND

This invention is intended for reducing the overall height of a computer keyboard, especially for laptop or handheld computers, when it is not in use. For mobile computers, both laptop and handheld computers, size is one of the most cited concerns. People want to have the size of the computer as small as possible but due to the ergonomic reasons, the size of those mobile computers on the horizontal plane is limited by the sizes of display and keyboard. Hence, the only space left to be shrunk is the vertical height of the computer. A thin keyboard is therefore desirable. A keyboard that is made of membrane switches is thin but it lacks the key stroke distance that makes it hard to be accepted by the general public. The keyboard to be disclosed here is a keyboard that gives a long key stroke distance compatible to a conventional desktop keyboard when in operation and remains thin when not in use. The keys on this keyboard will recess when the computer is turned off or the lid is closed, thereby providing an optimally thin device when not is use but providing optimal feel when being used.

There are a few US patents that mentioned something related to this invention:
(1) U.S. Pat. No. 4,795,888, "Variable Keystroke Pressure Apparatus", teaches a method of varying the pressure required for the keystroke by means of a variable pressure bladder.
(2) U.S. Pat. No. 5,595,449, "Inflatable Keyboard", teaches an inflatable keyboard using a hand pump and deformable keys.
(3) U.S. Pat. No. 5,459,461, "Inflatable Keyboard", teaches an inflatable keyboard using deformable keys.

There are a number of embodiments in this invention all with the intention of reducing the thickness of the keyboard while not in use by providing retractable keys. In the first embodiment, an inflatable air bag under the keys is used to raise the keys when in use and create the needed key stroke distance. The keys are conventional and not deformable. The air bag is self inflatable by the embedded springs under each keys. The keys will recess when the air is released or pumped out of the air bag. In a second embodiment, the keyboard is made up of two parallel sheets with springs between to enable the keystroke to be recorded and the key spring back to it's original position. When these sheets are sheared, the keyboard collapses to become very thin.

These and other objects, features and advantages will be apparent from the following more particular description of the preferred embodiments.

DETAILED DESCRIPTION

The following are the details of the invention.

Figure 1:
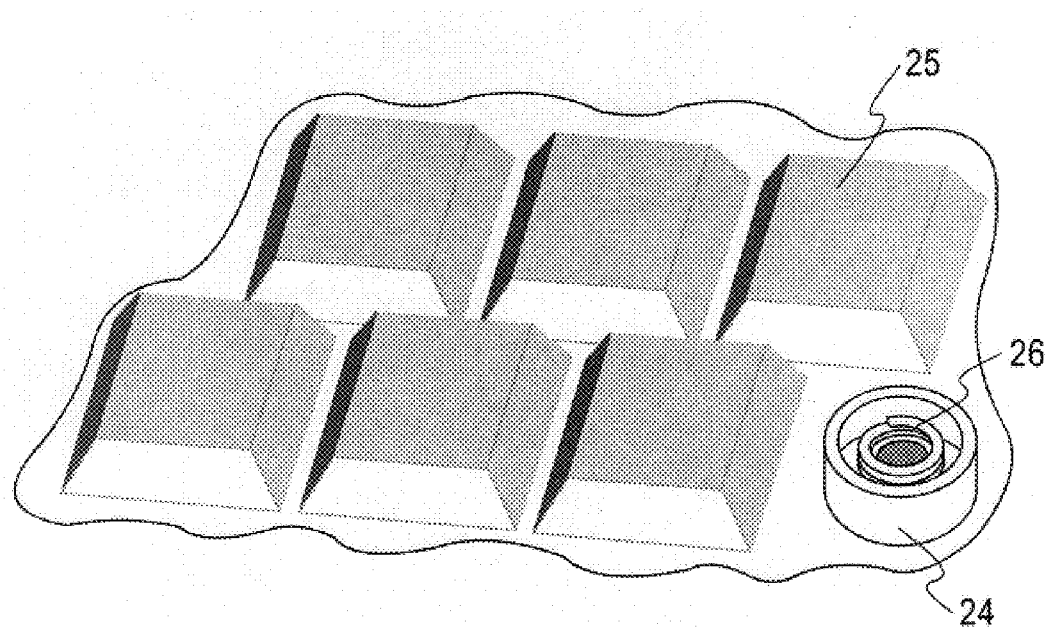
FIG. 1 shows the portion of the keyboard with retractable keys with one keycap off.

FIG. 1 below shows a partial isometric view of a keyboard with airbag retractable keys.

The keycap 25 is a conventional plastic keycap. The flexible, airtight polymer film 24 is glued under the back side of the keys and served as the top surface of the air bag. Each key has its own spring 26 placed under the key.

Figure 2:
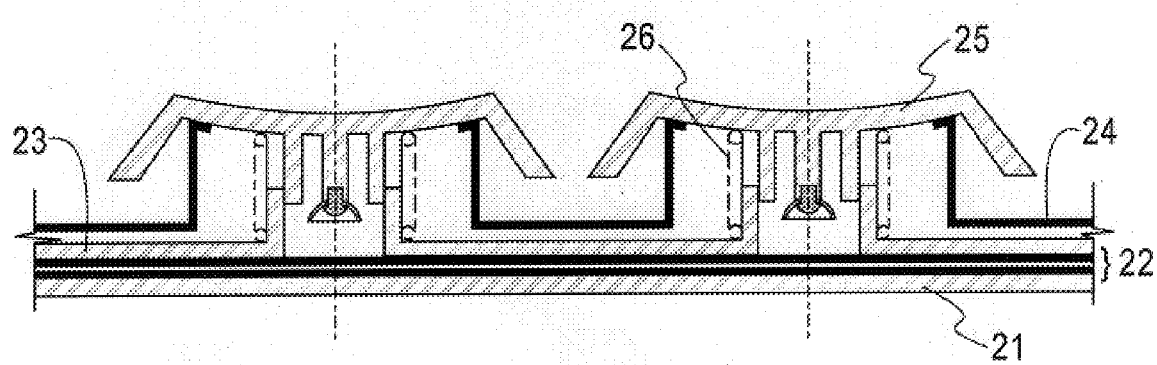
FIG. 2 is the cross-sectional view of the keyboard with airbag retractable mechanism when the keys are at fully standing mode.
Figure 3:
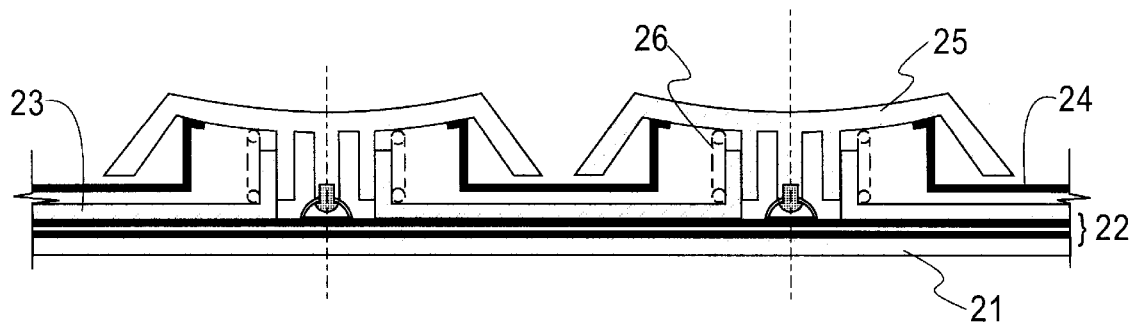
FIG. 3 is the cross-sectional view of the keyboard with airbag retractable mechanism when the keys are at fully retracted mode.

The cross-sectional views of the self-inflatable keyboard are depicted in FIGS. 2 and 3. FIG. 2 shows the keyboard is in fully standing mode and FIG. 2 is in fully retracted mode.

Figure 4:
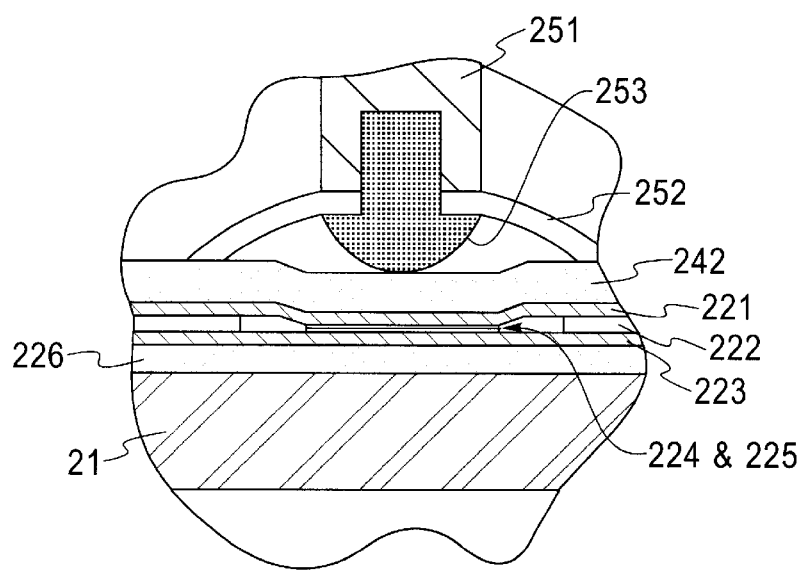
FIG. 4 is the enlarged portion of the key structure to show the detailed mechanism.
Figure 5:
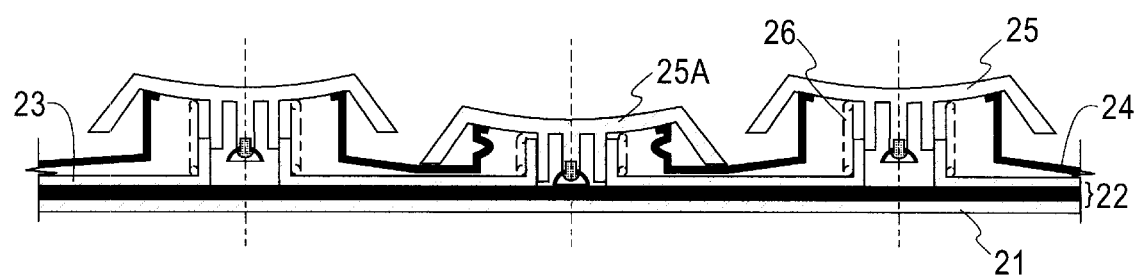
FIG. 5 is the cross-sectional view of the keyboard with airbag retractable mechanism when one of the keys is pressed down.

Referring to FIGS. 2 and 3, the key cap 25 is glued on the flexible, airtight polymer film 24. The guiding post 23 is used to guide the keys while they are traveling. The keyboard circuitry and the bottom surface of the airbag mechanism 22 is placed under the guiding post 23 and its detailed structure is shown in FIG. 4. The support plate 21 will support the whole structure of the keyboard.

Referring to FIG. 4, there are a disc spring 252 and an elastomer button 253 embedded into the tip of the stem 251 which is part of the key cap 25. The disc spring 252 will provide a tactile feedback to the user who presses the key down and the elastomer button 253 will compress the plastic sheet 242 downward to force the contact pad 224 in contact with its counterpart contact pad 225 on the other plastic sheet 226. The numerous contact pads 224 on the plastic sheet 242 are connected together by the electrically conductive lines 221. Similarly, the numerous contact pads 225 on the plastic sheet 226 are connected together by the electrically conductive lines 223. The contact pads and electrically conductive lines can be made from metal plating or conductive ink printing methods. The two plastic sheets 226 and 242 are separated by a stand-off sheet 222.

Figure 6:
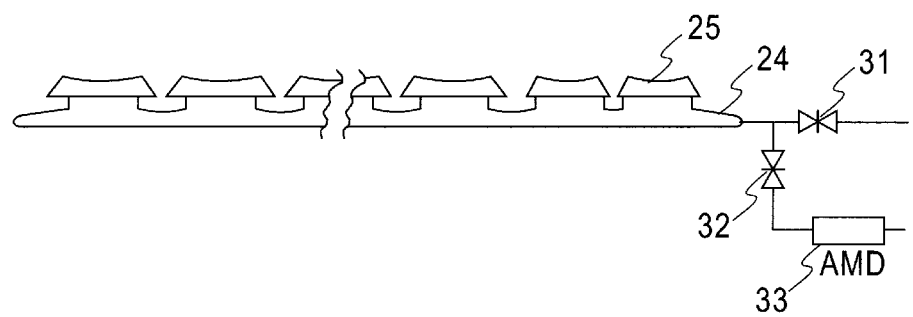
FIG. 6 is the schematic drawings of the keyboard with airbag retractable mechanism with control valves and an optional air moving device.

A schematic diagram of the keyboard with airbag retractable mechanism connected with control valves is shown in FIG. 6. When the keyboard is not in use, all keys are pressed down while the exhaust valve 31 is open. This can be done easily in the case of a laptop computer. The display cover of a laptop computer can be designed to press the keys all down while the display cover is in the closed position. After most of the air is out through the exhaust valve 31, the valve 31 will be closed. The atmospheric pressure will then act on the airbag and hold the keys in the retracted position. The overall height of the keyboard is therefore reduced by this mechanism. An optional air moving device (AMD) 33 and a valve 32 can be added to pump the air out of the air bag to further enforce the holding power of the airbag.

Figure 7A:
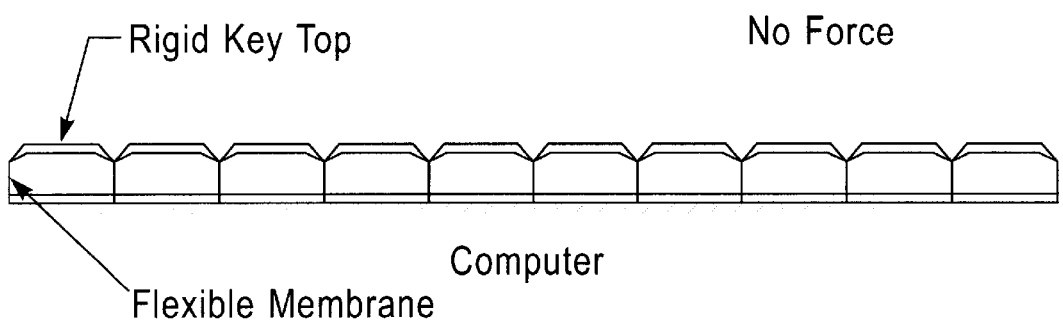
FIG. 7 is the schematic drawings of the keyboard with hinge-like retractable mechanism.
Figure 7B:
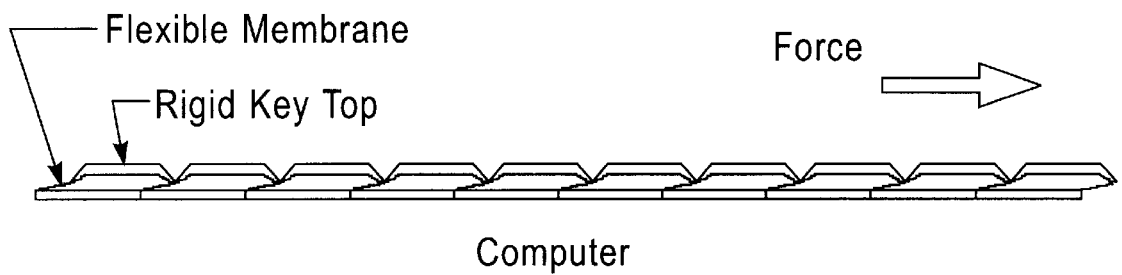

The keyboard with retractable keys using hinge-like structure is shown in FIG. 7. When no lateral force is applied to the keyboard, the flexible membranes relax into their natural position and the keyboard stands up and functions like a normal keyboard. When a lateral force is applied, the flexible membranes allow the ridged keycaps to move in the direction of force lowering the height of the keyboard.

The lateral force can be applied along the keycaps, along the keyboard support plate, or both. There are many ways to fabricate this kind of keyboard.

The lateral force required to flatten the keyboard into the closed position can be supplied by several sources. One method would be to link the keyboard to the laptop display so that closing the display also applies a lateral force to the keyboard, thus lowering the keys. A second method would be to have the use through a small lever to collapses the keyboard. A solenoid could also be used to pull the keyboard flat.

The electrical contact of the keys when pressed is similar to conventional keyboards. Although the schematic shows vertical connections between the keys, these connections can also be made in the center of the key and this vertical connection acting as the electrical linkage to indicate a key press. The vertical members can be manufactured from a plastic resin which will provide stiffness to give desirable ergonomics as the key is pressed, but collapse under pressure to allow the key to move in a predominately vertical manner, although a slight sideways motion as the key moves downward is not noticed by a user.

SUMMARY OF THE INVENTION

This invention describes a keyboard where the keys are raised up from a retracted position upon the initialization of usage of the keyboard. An embedded airbag mechanism is self-inflatable to raise keys to the normal operating heights. The keys will be retracted when the airbag is deflated. The rising and retracting of the keys can also be controlled by hinge-like structure. The close and open of the cover of a laptop computer will active the mechanism to raise and retract the keys on the keyboard.

While the present invention has been described with respect to preferred embodiments, numerous modifications, changes, and improvements will occur to those skilled in the art without departing from the spirit and scope of the invention.

We claim:

1. An apparatus comprising:
   a keyboard having a plurality of keys,
   a rising and retracting mechanism that controls the heights of the said plurality of keys,
   said rising and retracting mechanism comprises a plurality of springs, an inflatable airbag and airflow controlling valves.
   said inflatable airbag having a plurality of openings therein each corresponding to one of said plurality of said keys, each of said openings having a perimeter which is affixed to a key cap to form a key.

2. An apparatus according to claim 1, wherein said plurality of keys stand up upon initialization of usage of said apparatus by air being inserted into said airbag.

3. An apparatus according to claim 1, wherein said plurality of keys retract by forcing air inside said airbag out of said airbag.

4. An apparatus according to claim 1, wherein said plurality of keys remain in the retracted position by the atmospheric pressure acting on the airbag which remains empty in response to the airflow controlling valves.

5. An apparatus according to claim 1, further including a means for retracting said plurality of keys which is activated by closing a cover of a computer containing said keyboard.

6. An apparatus according to claim 1, further including an air moving device to pump out the air in said airbag.

7. An apparatus according to claim 1, wherein said airbag is constructed from two flexible polymeric sheets glued together, a top sheet of said airbag is glued to the plurality of the keycaps.

8. An apparatus according to claim 1 wherein said rising and retracting mechanism is made of a hinge structure.

9. An apparatus according to claim 8, further including mechanical levers to control the rising and retracting of the plurality of keys on the said keyboard.

10. An apparatus according to claim 9, wherein said mechanical levers are activated by a solenoid.

11. An apparatus according to claim 8, wherein said hinge structure is linked to an open and close mechanism of a cover of a computer.

12. An apparatus according to claim 8, wherein said hinge structure is raised and collapsed by applying a lateral force.

13. An apparatus according to claim 8, further including a cover of a computer, wherein a lateral force is provided by a mechanism on said cover during the opening and closing of the said cover.

14. An apparatus according to claim 8, further including a means for applying a lateral force to raise and lower said plurality of keys.

* * * * *